United States Patent [19]
Carlson

[11] Patent Number: 6,088,186
[45] Date of Patent: Jul. 11, 2000

[54] SERVO COMPENSATION SYSTEM

[75] Inventor: Lance Robert Carlson, Niwot, Colo.

[73] Assignee: STMicroelectronics, N.V., Netherlands

[21] Appl. No.: 08/960,181

[22] Filed: Oct. 29, 1997

[51] Int. Cl.[7] .................................................. G11B 5/596
[52] U.S. Cl. ................................... 360/77.04; 360/78.09; 369/44.32; 369/44.28
[58] Field of Search ............................. 360/77.04, 77.05, 360/77.06, 78.04, 78.09, 78.14; 369/44.13, 44.32, 44.28, 44.27, 50

[56] References Cited

U.S. PATENT DOCUMENTS

| | | | |
|---|---|---|---|
| 4,136,365 | 1/1979 | Chick et al. | 360/78 |
| 4,536,809 | 8/1985 | Sidman | 360/77 |
| 5,402,280 | 3/1995 | Supino | 360/77.04 |
| 5,404,253 | 4/1995 | Painter | 360/77.04 |
| 5,550,685 | 8/1996 | Drouin | 360/77.04 X |
| 5,585,976 | 12/1996 | Pham | 360/77.04 |
| 5,608,586 | 3/1997 | Sri-Jayantha et al. | 360/77.04 |
| 5,886,846 | 3/1999 | Pham et al. | 360/77.04 X |

*Primary Examiner*—Andrew L. Sniezek
*Attorney, Agent, or Firm*—Theodore E. Galanthay; Lisa K. Jorgenson; William J. Kubida

[57] ABSTRACT

The invention is a servo compensation method and system for use in a disk storage system. The disk storage system experiences error that causes a head to become mis-aligned with the disk. The error comprises run-out error and other servo position errors. During follow mode, a digital filter processes a position error signal to generate a compensation signal. The position error signal is comprised of components representative of the run-out error and the other servo position errors. The compensation signal is comprised of components that cause the servo positioning system to compensate for the run-out error and the other servo position errors. The digital filter also operates as an oscillator that provides an oscillating signal the spin frequency of the disk during seek mode.

27 Claims, 5 Drawing Sheets

SERVO COMPENSATION SYSTEM

FIELD OF THE INVENTION

The invention is related to the field of servo compensation for disk storage systems, and in particular, to a feedback control system that corrects run-out error and operates as an oscillator.

PROBLEM

Disk storage systems store data in circular tracks on a disk that is typically a magnetic disk or an optical disk. To read or write data to a magnetic disk, a servo positioning system positions a head over a track as the disk spins. Ideally, the servo positioning system would accurately position the head over the desired track, but disk storage systems experience servo position errors that cause a misalignment between the head and the track.

Disk storage systems correct servo position errors using a servo compensation system. The servo compensation system uses a feedback control loop to monitor the past performance of a system and make on-going adjustments to correct errors. The feedback control loop has a position error detection system that generates a position error signal using information obtained in current and previous read operations of servo data. A typical position error detection system is comprised of the following components coupled in series: a head, an amplifier, a read channel, a servo demodulator, an analog to digital converter, and subtraction circuit. The feedback control loop has a servo compensation system that processes the position error to generate a servo compensation signal. A typical servo compensation system is a digital filter. The feedback control loop also has a servo positioning system that adjusts the position of the head based on the servo compensation signal. A typical servo positioning system is comprised of the following components coupled in series: a digital to analog converter, a voice coil motor amplifier, a voice coil motor, and a voice coil motor actuator.

Run-out error is a specific type of position error that occurs when the disk or the circular tracks on the disk do not spin perfectly about the central axis of the disk. Run-out error is especially problematic for removable disks, such as floppy disks, because their axis of rotation is less stable than a fixed disk. Fixed disks also experience run-out error due to physical shocks encountered during handling.

Run-out errors are not adequately reduced by traditional servo compensation systems that are designed with a finite system gain at the run-out error frequency. Typical gain at the run-out error frequency is around 20 dB which is not enough to compensate for the run-out errors experienced by typical disk memory systems.

To address run-out error, additional run-out compensation systems have been coupled to the primary servo compensation systems. One existing run-out compensation system adds a feed-forward signal to the servo compensation signal. The feed-forward signal is not based on feedback, but is estimated based on previously measured run-out error. This system reduces run-out error, however, estimating expected run-out error cancellation requires complex mathematical modeling that often allows some run-out error to remain. When the run-out error changes, overall system operation must be interrupted so the feed-forward signal can be re-calibrated. Further, additional hardware, firmware, computation time, and memory are required to generate the feed-forward signal.

A second existing run-out compensation system is also coupled to the primary servo compensation system. This system uses feedback to generate a separate run-out compensation signal that is added to the servo compensation signal. This system reduces run-out error, however, the second feedback loop formed by the system interferes with the performance of the primary the servo compensation system. In addition, the separate run-out compensation system requires additional hardware, firmware, computation time, and memory A third existing run-out compensation system is also coupled in series with the primary servo compensation system. This system processes the servo compensation signal with a bandpass filter. This system reduces run-out error, however, it does not eliminate run-out error because it does not have infinite gain at the spin frequency.

Disk storage systems operate in two modes—the seek mode and the follow mode. In the seek mode, a desired track is located and the head is moved so it becomes positioned over the track. In the follow mode, the head remains positioned over the track. When the system changes from the seek mode to the follow mode, the components of the above compensation systems must be initialized before they can compensate for error. System initialization is undesirable because it takes time for the resulting transient responses to die out and has significant consequences on system performance.

Existing run-out compensation systems are added on to the primary servo compensation system and are not integrated into the primary servo compensation system. Some of these existing systems fail to eliminate run-out error. Some of these existing systems do not provide compensation during the seek mode and must be initialized at the beginning of each follow mode. For these reasons, there is an on-going need for an integrated servo compensation system that eliminates run-out error, and that operates during both the seek and follow modes to avoid initialization. Such a system has not existed prior to the disclosure of the following invention.

SOLUTION

The invention overcomes the problems discussed above by providing an integrated servo compensation system that eliminates run-out error for a disk storage system. The invention also operates during both the seek and the follow modes so it does not require initialization.

The servo compensation system is comprised of a compensation means that processes a position error signal during follow mode. The position error signal is comprised of components representative of the run-out error and components representative of other servo position errors. The compensation means generates a compensation signal responsive to the position error signal. The compensation signal is comprised of components that cause the servo positioning system to compensate for the run-out error and the other servo position errors. The servo compensation system also includes an oscillating means. The oscillating means generates an oscillating signal at the spin frequency of the disk. Since the spin frequency is equivalent to the run-out error frequency, the oscillating signal can be maintained to reduce run-out error during the seek mode.

The servo compensation system is based on a unique digital filter design. The design requirement combines solutions for run-out error and other servo position errors into a single difference equation. The difference equation is solved to eliminate run-out error by providing infinite gain at the spin frequency. This design requirement requires application of the final value theorem, but before the final value theorem can be applied, new poles are added to offset existing poles caused by the sinusoidal run-out error. New zeros are then added near the new poles to stabilize the design.

The firmware implementation of the filter design uses an approach that departs from standard implementations. Compensation signals are generated for the proportional path, the differential path, the integral path, and the spin frequency path. These signals are then summed to provide a single compensation signal. The firmware characteristics are then solved against the design requirements to finalize the filter design.

One advantage of the design is that both run-out error and other servo position errors are handled by a single compensation system. This results in less complexity and in the elimination of separate compensation systems. Another advantage of the design is that the compensation system can be operated as an oscillator during seek mode because of the additional poles.

DETAILED DESCRIPTION

Figure 1:
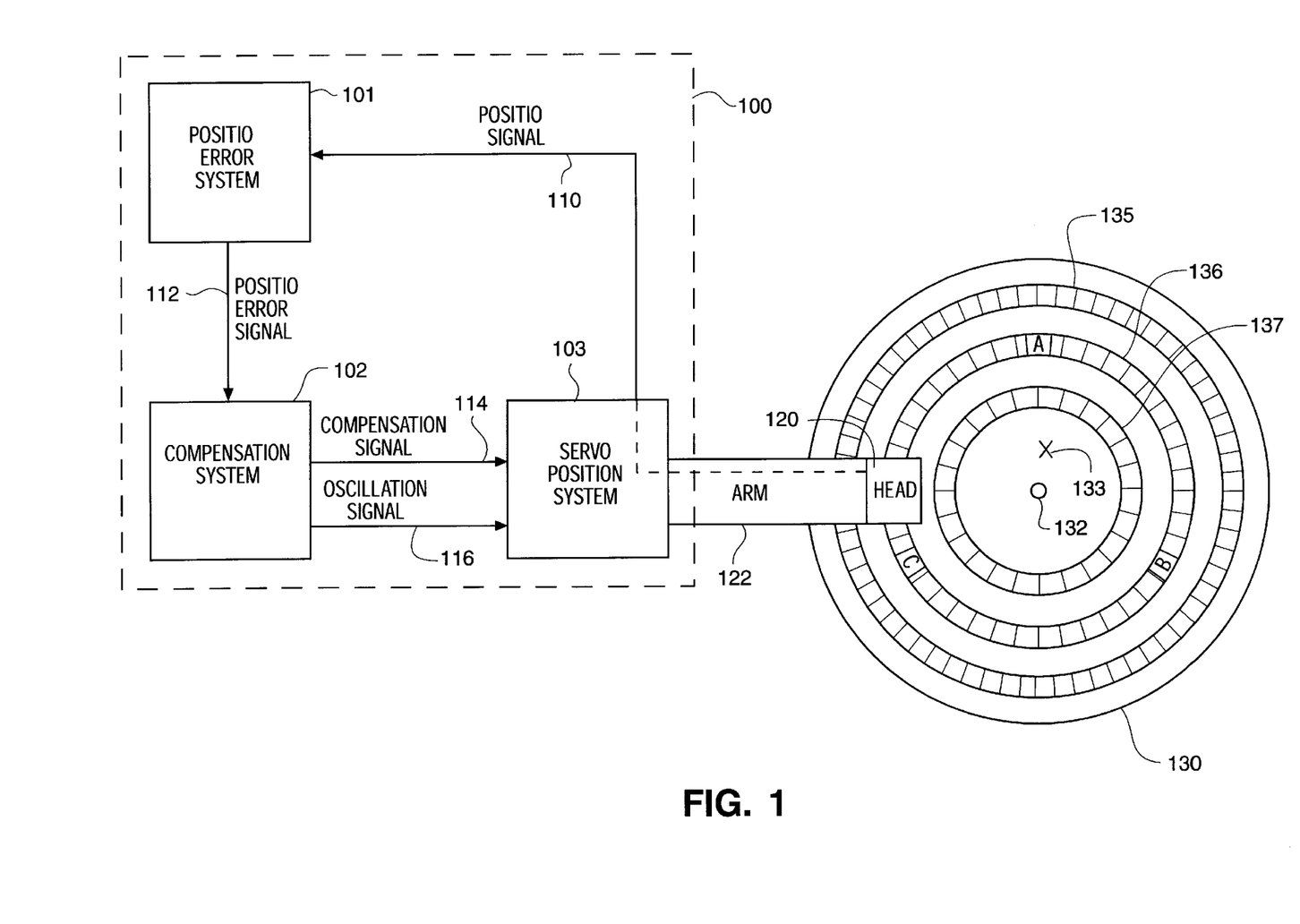
FIG. 1 is a block diagram of system architecture and operation for an example of the invention.

System Architecture and Operation—FIG. 1

FIG. 1 illustrates an example of an architecture for a disk storage system 100 in block diagram form. Disk storage system 100 includes a position error detection system 101, a compensation system 102, and a servo positioning system 103. The servo positioning system 103 is operationally connected to an arm 122 that is attached to a head 120. The servo positioning system 103 positions the head 120 over a disk 130 to read or write data. The disk 130 includes concentric tracks 135, 136, and 137 that are used to store data. The position error detection system 101 receives a position signal 110 from the head 120 and provides a position error signal 112 to the compensation system 102. The position signal 110 is a read signal that contains encoded position information. The position error detection system 101 amplifies and demodulates the read signal to generate the position error signal 112. In the follow mode, the compensation system 102 provides a compensation signal 114 to the servo positioning system 103. In the seek mode, the compensation system 102 provides an oscillation signal 116 to the servo positioning system 103.

It should be noted that the invention is generally discussed in the context of magnetic disk systems, but that the invention applies equally to optical disk systems, or other similar disc systems. As a result, the head 120 represents any device that reads data from the disk or writes data to the disk. The head 120 could be a magnetic read/write head, an optical transducer, a laser, or any similar device.

Disk storage systems operate in two modes—seek and follow. In the seek mode, the servo positioning system 103 re-positions the head 120 over a new track. For example, the servo positioning system 103 causes the head 120 to leave track 136 and seek track 137. In the follow mode, the servo positioning system 103 causes the head 120 to follow the track currently under the head 120. For example, the servo positioning system 103 causes the head 120 to remain positioned over track 136.

Disk storage systems experience position errors where the head 120 becomes mis-aligned with the disk 130. For example, it may be desired to position the head 120 over track 136, but due to position error, the head 120 may actually be positioned over track 135. This could prevent the head 120 from reading data from track 136. This could also result in the head 120 writing data to track 135 instead of track 136, and corrupting the existing data in track 135. Tracks 135–137 are depicted on FIG. 1 for illustrative purposes, but those skilled in the art appreciate that many more tracks can be contained on a disk. In addition, the width of the tracks and the distance between tracks is typically very small. On some disks, the width of a track is four micro-meters and the distance between tracks is one micro-meter.

Ideally, the disk 130 would spin about its central axis 132. This causes the circular track 136 to consistently spin under the head 120. Run-out error is a type of position error that occurs when the disk 130 does not spin about its central axis. For example, if the disk 130 were to spin about the spin axis 133, the head 120 would not remain positioned over track 136 as the disk 130 spins. Instead, tracks 135 or 137 may appear under the head 120. The invention compensates for both run-out error and other servo position errors by continually moving the head 120 so it remains positioned over the track 136, even when position errors are present.

The position error detection system 101 receives the position signal 110 from the head 120 and determines the actual position of the head 120 relative to the track 136. The position signal 110 is derived from position information that is read from the disk 130 and depicted on FIG. 1 as A, B, and C within the track 136. The actual position of the head 120 is then compared to the desired position of head 120. The resulting difference represents the position error and is represented by the position error signal 112. The position error signal is comprised of components representative of both run-out error and other servo position errors.

The compensation system 102 is comprised of a digital filter that is designed in accord with the present invention and discussed in detail below. The compensation system 102 processes the position error signal 112 during follow mode to generate the compensation signal 114. The compensation signal 114 is comprised of components that cause the servo positioning system 103 to compensate for the run-out error and the other servo position errors. The servo positioning system uses the arm 122 to re-position the head 120 in response to the compensation signal 114. This re-positioning of the head 120 compensates for the run-out error and the other servo position errors.

An example of system operation is provided below, but the invention is not restricted to this example. The example begins with the disk storage system in the follow mode and the head 120 positioned over track 136. Due to servo position error and run-out error, the head 120 becomes mis-aligned with track 136 as the disk 130 spins. The head 120 reads position information from servo data fields spaced at intervals on the disk 130. These readings generate position information samples at a rate based on the spin frequency of the disk 130 and the number of servo data fields that are read in each revolution. These readings provide position information that indicates the actual position of the head 120 relative to track 136 on the disk 130. The position information is incorporated into the position signal 110 and provided to the position error detection system 101. The position error detection system 101 amplifies and demodulates the position signal 101 before converting it to a digital signal. The position error detection system 101 then subtracts the position signal 110 from the desired position to obtain the position error. The position error is incorporated into the position error signal 112.

The compensation system 102 processes the position error signal 112 and generates the compensation signal 114. The compensation signal 114 is comprised of components that will cause the servo positioning system 103 to compensate for the run-out error and the other servo position errors. The compensation signal 114 is provided to the servo positioning system 103 where it is converted to an analog signal and amplified. The servo positioning system 103 then applies the compensation signal 114 to the voice coil motor actuator causing the voice coil motor to move the head 120. This movement compensates for the run-out error and the other servo position errors by attempting to re-position the head 120 exactly over track 136.

Figure 2:
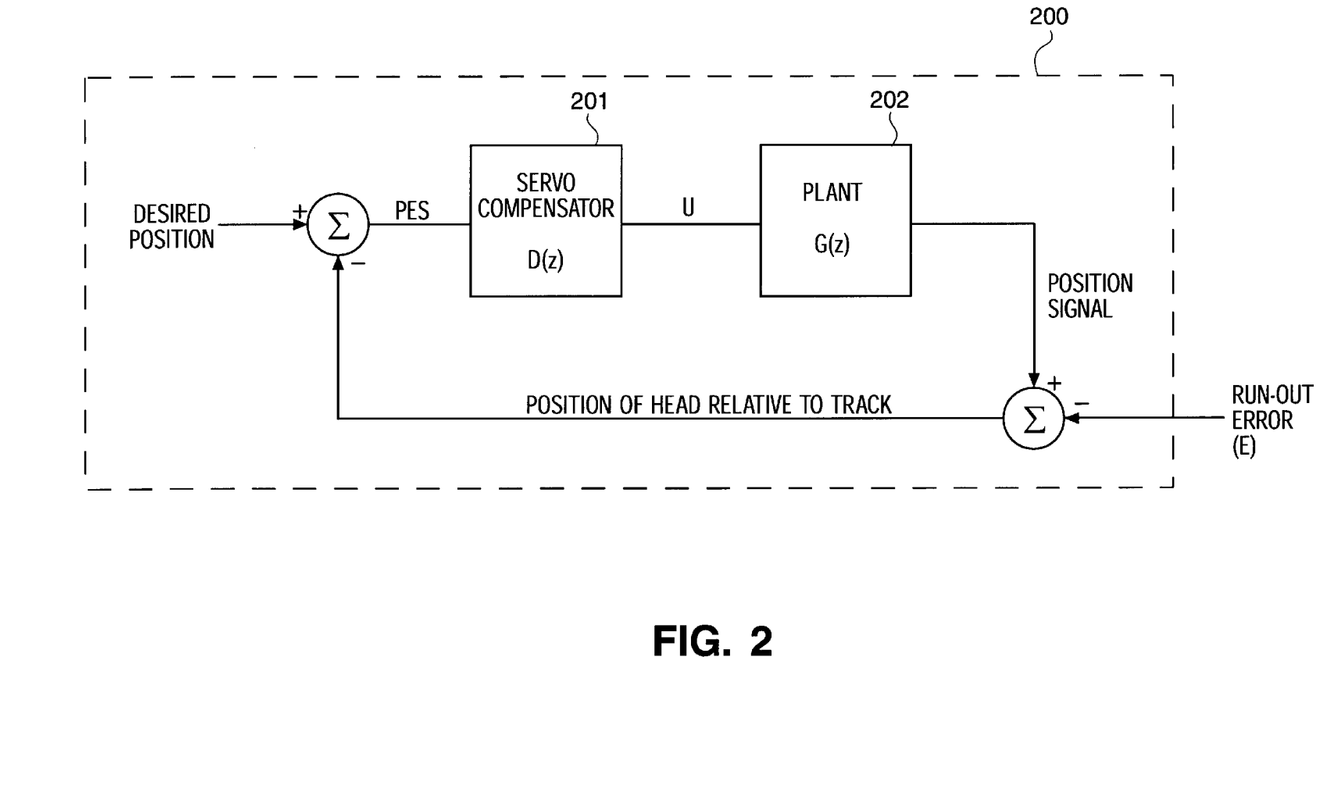
FIG. 2 is a block diagram of a feedback control loop for an example of the invention.
Figure 3:
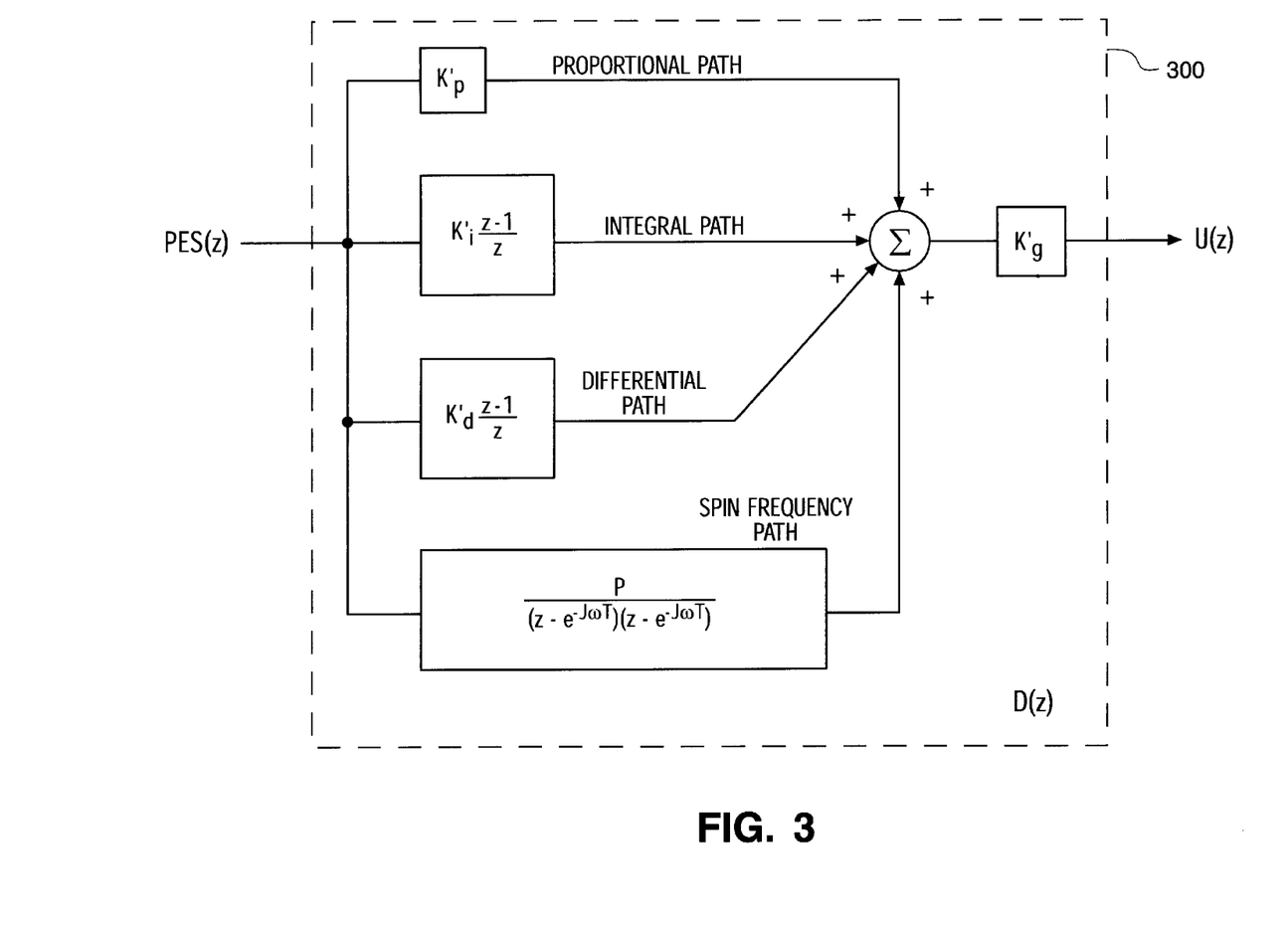
FIG. 3 is a block diagram of a digital filter for an example of the invention.
Figure 4:
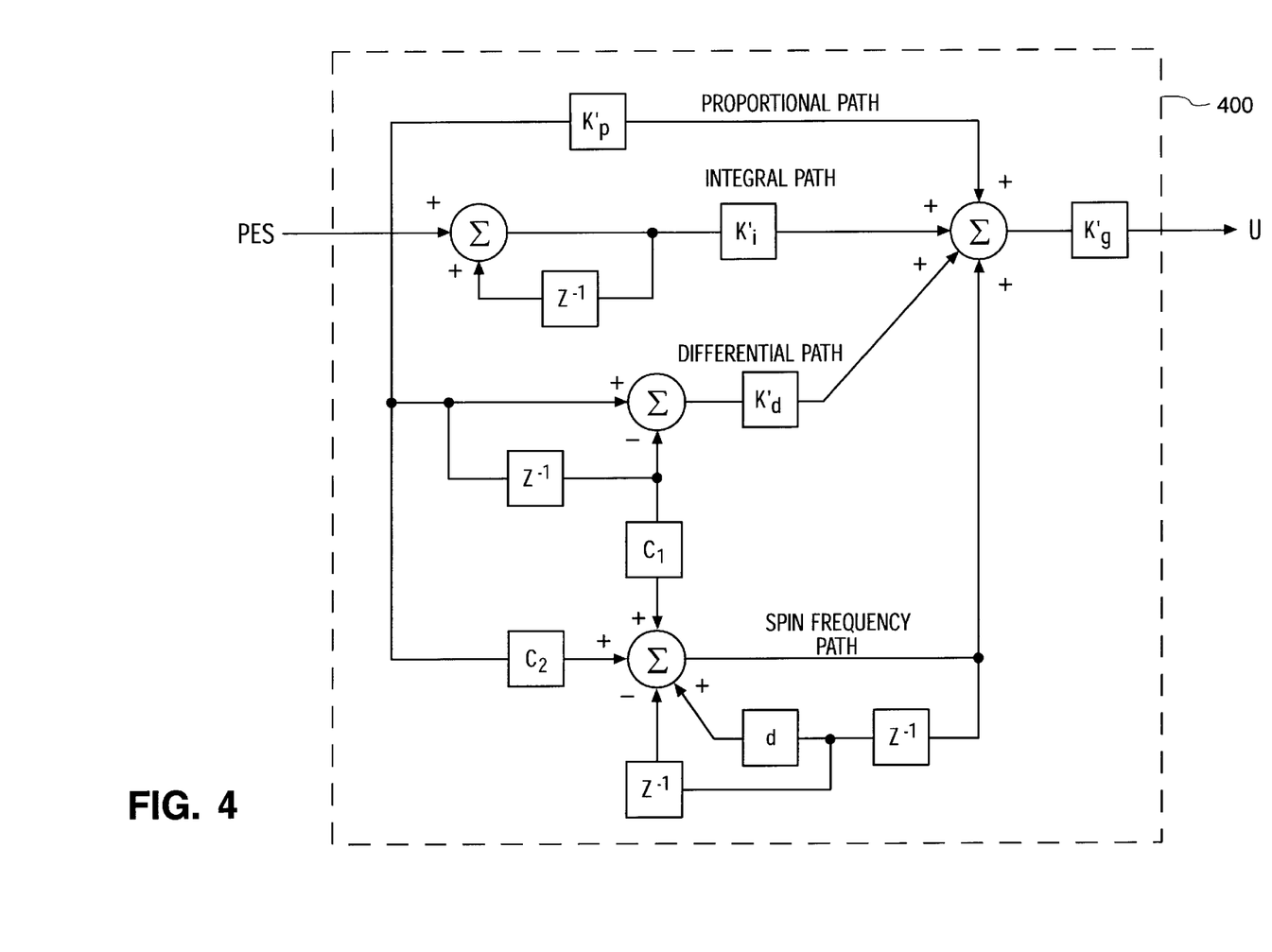
FIG. 4 is a block diagram of a digital filter for an example of the invention.

Compensation System Design—FIGS. 2–4

The servo compensation system is a digital filter that provides a compensation signal that causes the servo positioning system to correct run-out error and other servo positioning errors in the follow mode. The digital filter also provides an oscillating signal at the spin frequency that can be used as a feed forward signal to reduce run-out error in the seek mode.

FIG. 2 depicts a block diagram of the feedback control loop 200 for an example of the invention. Starting at the left, the position of the head relative to the disk is subtracted from the desired position to obtain the Position Error Signal (PES). The PES is provided to the servo compensator D(z) 201. The servo compensator 201 provides signal U to the plant G(z) 202. The plant 202 represents gain from components that are external to the servo compensator 201, such as digital-to-analog converters, amplifiers, VCM actuators, head widths, track pitch, and read channel. The plant 202 provides the position signal. At the right, the run-out error (E) is subtracted from the position signal to obtain the position of the head relative to the disk in the presence of run-out. This completes the feedback control loop.

The feedback control loop design uses the well known Z transform representation. The goal is to find a D(z) with PES=0 despite run-out error. By applying the final value theorem, a steady state filter design can be derived that eliminates run-out error. From the block diagram of FIG. 2, the Z transform of the PES is:

$$PES(z) = \frac{1}{1 + D(z)G(z)} \cdot E(z)$$

Since run-out error is a sinusoid at the spin frequency, E(z) is:

$$E(z) = \frac{z(z - \cos\omega T)}{(z - e^{j\omega T})(z - e^{-j\omega T})}$$

In the above equation, E(z) has poles on the unit circle that prevent application of the final value theorem to PES(z). These poles can be offset by adding poles to D(z) at:

$$z = e^{\pm j\omega T}$$

In addition to providing cancellation for the E(z) poles, these additional poles in D(z) can generate an oscillation signal if D(z) is operated in the seek mode. The oscillating behavior of D(z) represents a distinct advance in the art because D(z) operates to reduce run-out error in both the seek and follow mode, and as a result, D(z) does not require initialization.

The Z-plane unit circle is the stability boundary for the poles in the system. The additional poles on the unit circle make the filter unstable, so zeros are added near the additional poles at:

$$z = a e^{\pm j\omega T}$$

where (a) is between 0.95 and 0.995 with a preferred value of 0.98. A larger value for (a) results in: 1) less degradation in the control loop gain/phase margin, 2) a phase that is stable over a greater frequency range, and 3) longer settling time. D(z) becomes:

$$D(z) = K_p \left( 1 + K_d \frac{(z-1)}{z} + K_i \frac{z}{z-1} \right) \left( \frac{(z - a e^{j\omega T})(z - a e^{-j\omega T})}{(z - e^{j\omega T})(z - e^{-j\omega T})} \right)$$

where:

$K_p$=the scaling coefficient set for 0 db gain at desired Bode crossover frequency $$K_d = \frac{1}{T \cdot 2\pi f_d}$$

$$K_i = T \cdot 2\pi f_i$$

$f_d$=desired corner frequency for differentiator portion of D(z)

$f_i$=desired corner frequency for integrator portion of D(z); typically $f_d = f_i$ $f_{spin}$=spin frequency $\omega = 2\pi f_{spin}$ $$T = \frac{1}{f_{spin} \cdot \text{servo position samples per spin}}.$$

In the above equation for D(z), the second bracketed term represents the correction for the run-out error. The first bracketed term and $K_p$ represents the correction for the other servo position errors. D(z) has infinite gain at the spin frequency so it completely eliminates run-out error at the spin frequency. Well known root locus or Bode analysis techniques may be used to demonstrate that a given set of the above-listed design values produces a stable servo design.

The compensation for the other servo position errors has zeros for the integrator and differentiator corner frequencies. These corner frequencies are typically chosen to be the same frequency and are located between the spin frequency and the desired 0 db open-loop crossover frequency. This design produces a good trade off between high gain at the spin frequency to better correct run-out error and good phase margin for stable servo operation. The present compensation system can be further improved by lowering the frequency of these zeros. This does not affect the gain at the spin frequency because it is now infinite, but it does add phase/gain margin for more stable servo operation.

FIG. 3 shows a block diagram of a firmware implementation 300 for D(z) in an example of the invention. Conventional compensation techniques separate the run-out error compensation system from the servo compensation system. This means that the proportional path, the integral path, and the differential path for servo compensation are placed in one block, and the spin frequency path for the run-out compensation is placed in a completely separate block. In a distinct advance in the art, the invention places the spin frequency path in the same block with the other servo compensation paths, and thus, an entire block that includes both run-out compensation and servo compensation can be solved by a single difference equation. In the firmware implementation 300, all paths are placed in parallel.

A polynomial (P) has been added to the numerator of the spin frequency path so the D(z) for the firmware implementation 300 can be solved against the design requirement represented by the above equation for D(z). Based on standard block diagram analysis, the D(z) of the firmware implementation 300 is:

$$D(z) = K'_g \left( K'_p + K'_d \frac{z-1}{z} + K'_i \frac{z}{z-1} + \frac{P}{(z - e^{j\omega T})(z - e^{-j\omega T})} \right)$$

where:

$K'_g$=scalingcoefficient for 0 db gain at desired Bode crossover frequency $K'_p$ is obtained by solution of D(z) and is related to $K_p$ $K'_d$ is obtained by solution of D(z) and is related to $K_d$ $K'_i$ is obtained by solution of D(z) and is related to $K_i$ P=general second order polynomial $c_2 z^2 + c_1 z + c_0$ By equating the D(z) for the design requirement in the above equation to the D(z) for the firmware implementation 300, the following variables can be determined: $K'_g$, $K'_p$, $K'_d$, $K'_i$, $c_2$, $c_1$, and $c_0$. The solution has five equations and six variables, so the co variable can be eliminated. This represents a significant reduction in the firmware complexity. One filter state variable and one filter coefficient are eliminated. This is only possible because the solution for run-out error and the solution for the other servo position errors are combined into a single compensator block, and thus, they can be solved by the same difference equation. Those skilled in the art are familiar with the technique to solve D(z) for the above variables, and the solution is omitted for brevity.

FIG. 4 depicts block diagram of a firmware structure 400 for the above solution of D(z) in an example of the invention. The diagram uses an inverse Z transform where $z^{-1}$ is a delay of one sample and where d is related to the spin frequency and sample rate and is equal to: 2 cosine ($\omega$T). The spin frequency path including the $c_1$ variable represents the run-out compensation and the other paths represent compensation for the other servo position errors. The firmware structure 400 completely eliminates run-out error and also corrects the other servo position errors in a relatively simple and compact design.

Oscillation in the Seek Mode—FIGS. 1–5

Referring to FIG. 1, the head 120 of the disk storage system 100 follows track 136 in the follow mode. The disk storage system 100 enters the seek mode to move the head 120 from track 136 to another track, such as track 137. When track 137 is under the head 120, the disk storage system 100 returns to the follow mode to follow track 137. Existing compensation systems used in the follow mode are inoperative during the seek mode and must be initialized to begin the follow mode. Initialization requires an undesirable time delay for transient responses in the compensator to settle out. Advantageously, the invention remains operational in both the follow mode and the seek mode and does not require time-consuming initialization.

In the seek mode, the disk storage system 100 system sets the position error signal 112 to a value of zero. In response, the compensation system 102 behaves as an oscillator and generates the oscillation signal 116 at the frequency of the run-out error. The oscillation signal 116 is provided to the servo positioning system 103. The oscillation signal 116 is used as a feed-forward signal to attenuate error components present at the run-out frequency during the seek mode, and also eliminates the need to initialize the spin path portion of the compensator prior to entering the follow mode. The elimination of initialization is a distinct advantage over prior systems.

Poles are well known to those familiar with digital filter design. Poles represent points where the denominator is zero in an equation characterizing the response of a digital filter. From FIG. 3, it can be seen that the spin frequency path of D(z) contains poles on the unit circle which means that, upon absence of any input, D(z) behaves as an oscillator at a frequency corresponding to the pole locations. The pole locations correspond to the spin frequency. Thus, D(z) provides an oscillating signal at the spin frequency when it is operated in the follow mode for a time period and is operated independently of the feedback control loop with an input value forced to zero. The spin frequency is the same as the frequency of the run-out error and has correct phase and amplitude to exactly cancel the run-out error since it was operated previously in the follow mode. As a result, the oscillating signal can be used to cancel run-out error in the seek mode. If D(z) has reached a steady state during the follow mode, then D(z) was completely canceling out the run-out error and should continue to do so in the seek mode.

On FIGS. 3–4, the spin frequency path provides the oscillating signal when the input PES is set to zero. Only the spin frequency path needs to run to provide the oscillation signal. Since the signals through $c_1$ and $c_2$ are zero during the seek mode, only the remainder of the spin frequency path needs to run to provide the oscillation signal if desired.

Figure 5:
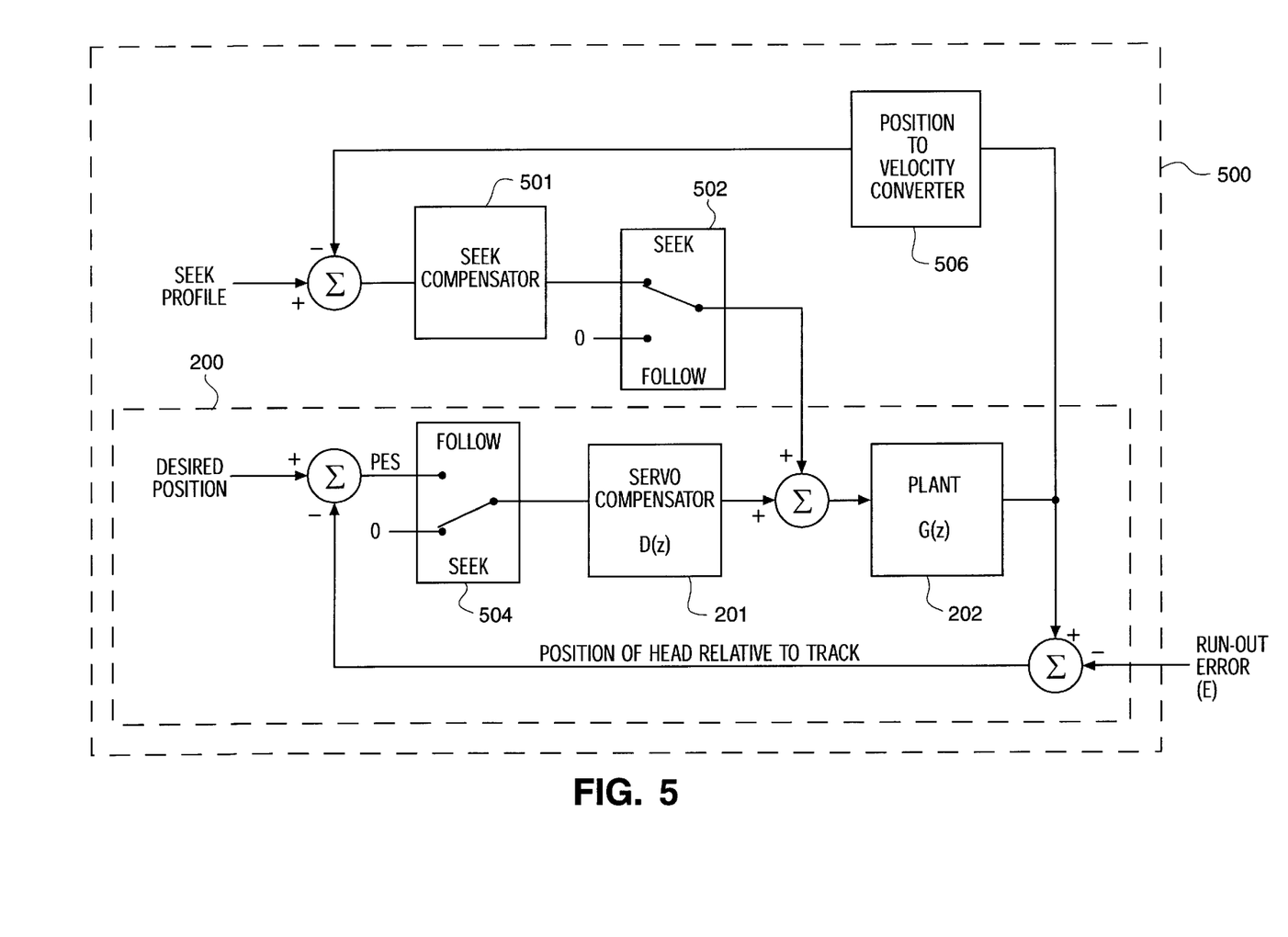
FIG. 5 is a block diagram of a mode switch-over feedback control loop for an example of the invention.

FIG. 5 depicts a block diagram of a mode switch-over feedback control loop 500 for an example of the invention. The mode switch-over feedback control loop is comprised of the of feedback control loop 200 of FIG. 2 including the following modifications. A switch 504 is added before the servo compensator 200. In addition, a seek compensator 501 and a switch 502 are shown and a position-to-velocity converter 506 is added in the seek mode compensation feedback loop. In the seek mode, the PES input is set to zero and the output of the servo compensator 200 is an oscillating signal at the spin frequency. The oscillating signal is combined with the seek compensation signal and provided to the plant 202. The feedback signal is converted into a velocity measurement, subtracted from the seek profile, and provided to the seek compensator to complete the loop. In the follow mode, the switches 502 and 504 switch-over to the follow leads, and the system then operates the same as discussed for FIG. 2.

The use of the compensation system as an oscillator during the seek mode can be used to compensate for run-out error, but it also has another major advantage. The compensator does not need to be initialized when the system switches from the seek mode to the follow mode. This is because the compensation system is already running during seek mode and tracking run-out error. It is ready when the follow mode begins and no initialization period is required. This provides significant time savings and performance enhancement.

CONCLUSION

The invention is an integrated servo compensation system that corrects both run-out error and other servo position errors in the follow mode. The invention is operated as an oscillator during seek mode to cancel run-out error. Continuous operation eliminates the initialization period required by existing systems. The invention has been described in the context of magnetic disk systems, but it is also readily applicable to optical disk systems or other similar disc systems. Those skilled in the art will appreciate how to apply the invention to optical disk systems or to other similar disk systems.

Those skilled in the art can appreciate variations of the above-described embodiments that fall within the scope of the invention. As a result, the invention is not limited to the specific embodiments discussed above, but only by the following claims and their equivalents.

What is claimed is:

1. A servo compensation system for a disk storage system wherein the disk storage system uses a servo positioning system to position a head relative to a disk, wherein the disk storage system operates in a seek mode and in a follow mode, wherein the disk storage system experiences error that causes the head to become mis-aligned with the disk, wherein the error comprises run-out error and other servo position errors, and wherein the error is indicated by a position error signal, the system comprising:
   a compensation means for processing a position error signal during the follow mode and generating a compensation signal responsive to the position error signal, wherein the compensation means has zeroes at $ae^{+j\omega\tau}$ and $ae^{-j\omega\tau}$ wherein $\omega$ equals the spin frequency of the disk and a is between 0.95 and 0.995, wherein the position error signal is comprised of components representative of the run-out error and the other servo position errors, and wherein the compensation signal is comprised of components that cause the servo positioning system to compensate for the run-out error and the other servo position errors; and
   an oscillating means for providing an oscillating signal during the seek mode, wherein the oscillating signal is at a spin frequency of the disk, and wherein the oscillating means is incorporated within the compensation means.

2. The system of claim 1 further comprising a position error means that is operationally coupled to the compensation means and that is for processing a position signal and generating the position error signal, wherein the position signal indicates the position of the head relative to the disk.

3. The system of claim 1 further comprising a servo positioning means that is operationally coupled to the compensation means and that is for positioning the head relative to the disk in response to the compensation signal wherein the positioning compensates for the run-out error and the other servo position errors.

4. The system of claim 1 further comprising a switching means for switching the system between the follow mode and the seek mode.

5. The system of claim 1 where the compensation signal is comprised of components that cause the servo positioning system to eliminate the run-out error at steady-state.

6. The system of claim 1 wherein the compensation means comprises a single digital filter.

7. The system of claim 6 wherein the digital filter has infinite gain at the spin frequency of the disk.

8. The system of claim 6 wherein the digital filter does not initialize in response to a switch-over from the seek mode and the follow mode.

9. The system of claim 6 wherein the digital filter has poles at $e^{+j\omega t}$ and $e^{-j\omega t}$ and where $\omega$ equals the spin frequency of the magnetic device.

10. The system of claim 6 wherein the digital filter is comprised of
    a proportional compensation path;
    a integral compensation path;
    a differential compensation path;
    a spin frequency compensation path; and
    wherein the paths are arranged in parallel.

11. The system of claim 1 wherein the oscillation signal is used as a feed-forward signal in the seek mode to compensate for the run-out error.

12. The system of claim 1 where in the oscillation means generates the oscillation signal in response to the position error signal being set to zero.

13. A servo compensation system for a disk storage system wherein the disk storage system uses a servo positioning system to position a head relative to a disk, wherein the disk storage system operates in a seek mode and in a follow mode, wherein the disk storage system experiences error that causes the head to become mis-aligned with the disk, wherein the error comprises run-out error and other servo position errors, and wherein the error is indicated by a position error signal, the system comprising:
    a compensation means for processing a position error signal during the follow mode and generating a compensation signal responsive to the position error signal, wherein the compensation means comprises a single digital filter having zeroes at $ae^{+j\omega\tau}$ and $ae^{-j\omega\tau}$ wherein $\omega$ equals the spin frequency of the disk and wherein the a is between 0.95 and 0.995, wherein the position error signal is comprised of components representative of the run-out error and the other servo position errors, and wherein the compensation signal is comprised of components that cause the servo positioning system to compensate for the run-out error and the other servo position errors; and
    an oscillating means for providing an oscillating signal during the seek mode, wherein the oscillating signal is at a spin frequency of the disk, and wherein the oscillating means is incorporated within the compensation means.

14. The system of claim 13 further comprising a position error means that is operationally coupled to the compensation means and that is for processing a position error signal and generating the position error signal, wherein the position signal indicates the position of the head relative to the disk.

15. The system of claim 13 further comprising a servo positioning means that is operationally coupled to the compensation means and that is for positioning the head relative to the disk in response to the compensation signal where in the positioning compensates for the run-out error and the other servo position errors.

16. The system of claim 13 further comprising a switching means for switching the system between the follow mode and the seek mode.

17. The system of claim 13 where the compensation signal is comprised of components that cause the servo positioning system to eliminate run-out error at steady state.

18. The system of claim 13 wherein the digital filter has infinite gain at the spin frequency of the disk.

19. The system of claim 13 wherein the digital filter does not initialize in response to a switch-over from the seek mode and the follow mode.

20. The system of claim 13 wherein the digital filter has poles at $e^{+j\omega\tau}$ and $e^{-j\omega\tau}$ and where w equals the spin frequency of disk.

21. The system of claim 13 wherein the digital filter is comprised of
- a proportional compensation path;
- a integral compensation path;
- a differential compensation path;
- a spin frequency compensation path; and
- wherein the paths are arranged in parallel.

22. The system of claim 13 wherein the oscillation signal is used as a feed-forward signal in the seek mode to compensate for the run-out error.

23. The system of claim 13 where the digital filter generates the oscillation signal in response to the position error signal being set to zero.

24. A method for operating a servo compensation system in a disk storage system wherein the disk storage system operates in a seek mode and in a follow mode, wherein the disk storage system experiences error that causes a head to become mis-aligned with a disk, and wherein the error comprises run-out error and other servo position errors, and wherein a position signal indicates the position of the head relative to the disk, the method comprising:

(a) in a position error detection system, processing the position signal to generate a position error signal wherein the position error signal is comprised of components representative of the run-out error and the other servo position errors;

(b) providing the position error signal to a digital filter;

(c) in the digital filter, processing the position error signal to generate a compensation signal, wherein the compensation signal is comprised of components that cause the servo positioning system to compensate for the run-out error and the other servo position errors;

(d) providing the compensation signal to a servo positioning system;

(e) in the servo positioning system, positioning the head relative to the disk in response to the compensation signal, wherein the positioning compensates for the run-out error and the other servo position errors (f) switching from the follow mode to the seek mode wherein steps (a), (b), (c), (d), and (e), are performed during the follow mode; and (g) in the digital filter, providing an oscillating signal a spin frequency of the disk during the seek mode.

25. The method of claim 24 further including setting the position error signal to zero after step (f) and wherein the digital filter generates the oscillation signal in response to the position error signal being set to zero.

26. The method of claim 24 wherein the digital filter does not initialize in response to step (f).

27. The method of claim 25 further comprising using the oscillation signal as a feed-forward signal to compensate for the run-out error in the seek mode.

* * * * *